United States Patent [19]

Byrne et al.

[11] Patent Number: 4,606,813

[45] Date of Patent: Aug. 19, 1986

[54] FLUID CATALYTIC CRACKING CATALYST FOR CRACKING SULFUR CONTAINING PETROLEUM FEEDSTOCKS AND A PROCESS FOR USING IT

[75] Inventors: John W. Byrne, Saddle Brook; Barry K. Speronello, River Edge, both of N.J.

[73] Assignee: Engelhard Corporation, Menlo Park, N.J.

[21] Appl. No.: 730,111

[22] Filed: May 3, 1985

Related U.S. Application Data

[63] Continuation of Ser. No. 522,654, Aug. 12, 1983, abandoned, which is a continuation-in-part of Ser. No. 469,765, Feb. 25, 1983, Pat. No. 4,493,902.

[51] Int. Cl.$^4$ .................... C10G 11/05; B01J 29/08
[52] U.S. Cl. .................... 208/120; 502/65; 502/64; 502/68
[58] Field of Search ............ 502/65, 64, 68; 208/120

[56] References Cited

U.S. PATENT DOCUMENTS

| | | | |
|---|---|---|---|
| 4,204,945 | 5/1980 | Flanders et al. | 208/120 |
| 4,243,556 | 1/1981 | Blanton, Jr. | 502/64 |
| 4,252,636 | 2/1981 | Mooi | 208/120 |
| 4,423,019 | 12/1983 | Bertolacini et al. | 423/244 |
| 4,493,902 | 1/1985 | Brown et al. | 502/65 |

*Primary Examiner*—Carl F. Dees
*Attorney, Agent, or Firm*—Inez L. Moselle

[57] ABSTRACT

The present invention is directed to a fluid catalytic cracking catalyst comprising a blend of a catalytically active first component and a second component for reducing the emissions of oxides of sulfur from the regenerator of a catalytic cracking unit and the use of that catalyst to crack sulfur containing petroleum feedstocks. The catalytically active first component contains Y-faujasite zeolite and comprises about 10–70% by weight, preferably about 25–50% by weight, of the catalyst. The second component of the catalyst comprises about 30–90% by weight, preferably about 50–75% by weight, of the catalyst. The second component comprises fluidizable particles containing at least about 70% by weight, preferably at least about 90% by weight, alumina and having an equilibrium surface area in the range of about 40–100 m$^2$/g., preferably in the range of about 50–90 m$^2$/g.

39 Claims, No Drawings

FLUID CATALYTIC CRACKING CATALYST FOR CRACKING SULFUR CONTAINING PETROLEUM FEEDSTOCKS AND A PROCESS FOR USING IT

This is a continuation of application Ser. No. 522,654, filed Aug. 12, 1983, now abandoned, which was a continuation-in-part of application Ser. No. 469,765, filed Feb. 25, 1983, now U.S. Pat. No. 4,493,902.

BACKGROUND OF THE INVENTION

The present invention relates to a novel fluid catalytic cracking catalyst comprising a catalytically active first component and a second component for reducing the emissions of oxides of sulfur from the regenerator of a fluid catalytic cracking unit and the use of that catalyst to crack sulfur containing petroleum feedstocks.

Modern fluid catalytic cracking units comprise a cracking zone which is sometimes referred to as the reactor and a regeneration zone which is sometimes referred to as the regenerator. In the cracking zone, a petroleum feedstock is contacted with a fluid catalytic cracking catalyst comprising Y-faujasite at a temperature of about 800°–1100° F. to crack the hydrocarbon molecules in the feedstock and to produce a complex mixture of vaporous products, including products which are sometimes referred to as dry gases (hydrogen, hydrogen sulfide, and hydrocarbon gases containing one or two carbon atoms), gases (hydrocarbon gases containing three or four carbon atoms) and gasoline (hydrocarbons having a boiling point under about 420° F. and containing five or more carbon atoms).

During cracking, a carbonaceous deposit called coke is deposited on the cracking catalyst. As will be described in more detail below, after the cracking catalyst containing coke is separated from the vaporous products of the cracking reaction, the coke is removed from the cracking catalyst in the regeneration zone. The regenerated catalyst is then recirculated to the cracking zone where it cracks additional petroleum feedstock.

The petroleum feedstock that is cracked in the cracking zone typically contains sulfur which is chemically combined with the hydrocarbon molecules in the feedstock. During cracking, most of the sulfur in the feedstock is converted to a vaporous form in which it is removed from the reactor along with the other vaporous products of the cracking reaction. Generally, about 40–60% of the sulfur in those vaporous products is in the form of hydrogen sulfide. The hydrogen sulfide may be recovered from the other vaporous products by methods well known in the art.

Not all the sulfur in the petroleum feedstock is removed from the reactor with the vaporous products of the cracking reaction. In particular, a minor portion of the sulfur in the petroleum feedstock (e.g., 5–10% by weight of the sulfur in the feedstock) is deposited, along with the coke, on the cracking catalyst itself.

The cracking catalyst containing coke and sulfur is regenerated in the regeneration zone by contacting it with air at high temperature, e.g., 1200°–1600° F., to burn the coke off the catalyst and to produce a flue gas containing oxides of sulfur, oxides of carbon and particulate materials. Such flue gases sometimes contain 2000 parts per million by volume (ppmv) or more of oxides of sulfur.

Particularly during the past 10 years or so, a substantial amount of effort has been devoted to the study and development of techniques for reducing the quantity of the oxides of sulfur in flue gases emitted from fluid catalytic cracking regenerators. For example, we understand that in the early 1970's the Environmental Protection Agency contracted the Monsanto Research Corporation to identify conceptual techniques for reducing the quantity of the emissions of oxides of sulfur from fluid catalytic cracking regenerators and to perform a feasibility analysis of the techniques identified. A report on the first phase of that study describes a survey of over 100 conceptual techniques which were said to be "applicable to fluid catalytic cracker (FCC) regenerator off-gas sulfur dioxide emission reduction". See Ctvrtnicek, Refinery Catalytic Cracker Regenerator $SO_x$ Control Process Survey, EPA Report No. 650/2-74-082, at Abstract and pp. 70–83 (September 1974).

One approach for reducing the quantity of the oxides of sulfur in regenerator flue gases that has received considerable attention is the addition of a metallic reactant such as a metallic oxide to the circulating cracking catalyst Bertolacini U.S. Pat. No. 4,376,103 (the '103 patent) reports at col. 3, line 58-col. 4, line 20 that the metallic oxide "absorbs the sulfur oxides produced in the regenerator" by the following chemical reactions, which are said to be reversible:

$$M_xO + SO_2 \rightarrow M_xSO_3$$

$$M_xO + SO_3 \rightarrow M_xSO_4$$

$$M_xO + SO_2 + \tfrac{1}{2}O_2 \rightarrow M_xSO_4$$

where M is the metal and x is the ratio of the oxidation state of the oxide ion to the oxidation state of the metal ion.

The '103 patent discloses that the sulfites and sulfates that are "absorbed" by the metallic oxide are liberated as hydrogen sulfide gas in the reducing atmosphere of the cracking zone of the cracking unit by the following reactions:

$$M_xSO_3 + 3H_2 \rightarrow M_xO + H_2S + 2H_2O$$

$$M_xSO_4 + 4H_2 \rightarrow M_xO + H_2S + 3H_2O$$

$$M_xSO_3 + 3H_2 \rightarrow M_xS + 3H_2O \rightarrow M_xO + H_2S + 2H_2O$$

$$M_xSO_4 + 4H_2 \rightarrow M_xS + 4H_2O \rightarrow M_xO + H_2S + 3H_2O$$

where M and x are as above.

As can be seen from the above equations, in connection with the liberation of hydrogen sulfide gas in the cracking zone, the metallic material is converted back to its metallic oxide form so that it can "absorb" additional oxides of sulfur when it is recirculated to the regeneration zone.

In theory, the use of a metallic reactant such as a metallic oxide to reduce the quantity of oxides of sulfur in regenerator flue gases has a number of advantages. Some of those advantages are described in the '103 patent at col. 3, line 63-col. 4, line 5 as follows:

"This approach is so attractive because the sulfur thus shifted from the regenerator flue gas to the reactor effluent is simply a small addition to the large amount of hydrogen sulfide invariably present in the reactor effluent. The small added expense, if any, of removing even as much as 5 to 15 percent more hydrogen sulfide from an FCC reactor gas stream by available means is substantially less than, for example, the expense of separate feed desulfurization or flue gas scrubbing to reduce the level of sulfur oxides in the regenerator flue gas."

Despite these advantages, there are a number of obstacles which togehter have inhibited the development of a commercially practicable catalyst that includes a metallic reactant for substantially reducing the quantity of oxides of sulfur in regenerator flue gases. One obstacle is the requirement that the metallic reactant be capable of substantially reducing the quantity of oxides of sulfur in the flue gas under the conditions present in the regeneration zone and at the same time be capable of releasing a substantial amount of the "absorbed" sulfur as hydrogen sulfide gas under the conditions present in the cracking zone.

Another obstacle is that the metallic reactant must be capable of withstanding the conditions in the catalytic cracking unit. In particular, the metallic reactant must be in a form that is sufficiently resistant to attrition and to other adverse effects in the cracking unit (e.g., deactivation of the metallic reactant by silica migration) to be commercially practicable.

The metallic reactant must also not detract from the characteristics of the other components of the catalytic cracking catalyst in a commercially unacceptable way. In this connection, it has long been recognized that for a fluid catalytic cracking catalyst to be commercially successful, it must have commercially acceptable activity, selectivity, and stability characteristics. It must be sufficiently active to give economically attractive yields, it must have good selectivity towards producing products that are desired and not producing products that are not desired, and it must be sufficiently hydrothermally stable and attrition resistant to have a commercially useful life.

One product that is undesirable in commercial catalytic cracking processes is excessive coke. Even small increases in the yield of that product relative to the yield of gasoline can cause significant practical problems. For example, such increases can cause undesirable increases in the heat that is generated by burning off the coke during the highly exothermic regeneration of the catalyst.

Other products that are undesirable are dry gases and gases, particularly the dry gases. One reason for this is that in commercial refineries expensive compressors are used to handle dry gases and gases. Increases in the volume of those products produced, therefore, can add substantially to the capital expense of a refinery.

Because of all the foregoing constraints, it has proven difficult to develop commercially practicable fluid catalytic cracking catalysts that include a metallic reactant for substantially reducing the quantity of the oxides of sulfur present in regenerator flue gases.

SUMMARY OF THE INVENTION

The present invention is directed to a fluid catalytic cracking catalyst comprising a blend of a catalytically active first component and a second component for reducing the emissions of oxides of sulfur from the regenerator of a catalytic cracking unit and the use of that catalyst to crack sulfur containing petroleum feedstocks. We believe that the use of our fluid catalytic cracking catalyst will result in the emission of substantially less oxides of sulfur from regenerators in fluid catalytic cracking units than are emitted with the use of other commercial fluid catalytic cracking catalysts.

The catalytically active first component of the catalyst of our invention contains Y-faujasite zeolite and comprises about 10–70% by weight, preferably about 25–50% by weight, of the catalyst. The first component comprises at least about 40% by weight Y-faujasite or has a deactivated activity at least about 1.5 times that of standard commercial catalyst or both. Preferably, the first component comprises about 50–70% by weight Y-faujasite and has a deactivated activity at least about 2.0 times that of standard commercial catalyst.

For the purpose of describing and defining our invention, the percentages of the components of our blend are determined on a volatile free basis. The quantity of volatile material in our catalyst or in a component of our catalyst may be determined by measuring the weight loss of the catalyst or component after it was calcined first for ½ hour at about 800° F. and then for 1 hour at about 1830° F.

As used herein, Y-faujasite shall include synthetic faujasite zeolites exhibiting, in the sodium form, an X-ray diffraction pattern of the type described in Breck, Zeolite Molecular Sieves, p. 369, Table 4.90 (1974), and having a crystalline unit cell size, in the sodium form (after washing any crystallization mother liquor from the zeolite), of less than about 24.75 Å as determined by the technique described in the ASTM standard method of testing titles "Determination Of The Unit Cell Dimension Of A Faujasite-Type Zeolite" (Designation D3942-80) or by an equivalent technique. The term Y-faujasite shall encompass the zeolite in its sodium form as well as in known modified forms, including, e.g., rare earth and ammonium ion exchanged forms and stabilized forms.

The term deactivated activity shall have the same meaning in this application as it does in U.S. patent application Ser. No. 469,765, filed Feb. 25, 1983, (the '765 application) now U.S. Pat. No. 4,493,902, which patent is incorporated herein by reference. In brief, the deactivated activity of the first component is determined by treating it with steam for four hours at 1450° F. in accordance with the "open system" procedure described in the main text of the publication entitled "Engelhard Procedure For The Hydrothermal Deactivation Of Fluid Catalytic Cracking Catalysts" and then determining its catalytic activity by the procedure described in the '765 application. The publication referred to in the preceding sentence has been deposited at The Library of The Technical Information Center, Engelhard Corporation, Edison, N.J. 08818 (Dewey Decimal Number 665.533 EC/H). Access to this Library, including this publication, can be obtained by writing or telephoning to the Manager of The Technical Information Center. In addition, a copy of this publication can be obtained by writing to: Director of Patents, Minerals and Chemicals Division, Engelhard Corporation, Edison, N.J. 08818 (hereinafter Engelhard's Minerals and Chemicals Division Patent Department).

The standard commercial catalyst referred to in this application is the sample of Ultrasiv ® 260 catalyst that is also referred to as standard commercial catalyst in the '765 application. As noted in the '765 application, small amounts of the standard commercial catalyst can be obtained for testing purposes by writing to Engelhard's Minerals and Chemicals Division Patent Department.

The second component of the catalyst of our invention comprises about 30–90% by weight, preferably about 50–75% by weight, of the catalyst. The second component comprises fluidizable particles containing at least about 70% by weight, preferably at least about 90% by weight, alumina and having an equilibrium surface area in the range of about 40–100 m²/g., preferably in the range of about 50–90 m²/g. Typically, the fluidizable particles have average particle diameters on the order of 50–100 microns.

As used herein, alumina shall include alumina in the hydrated, rehydrated, or calcined form. In those cases where the alumina is introduced into the cracking unit in a hydrated form (e.g., as α-alumina trihydrate) or in a rehydrated form, it is converted to a calcined form in the cracking unit itself.

For the purpose of describing and defining our invention, the equilibrium surface area of our second component is determined by hydrothermally treating a sample of that component with 100% steam at 1500° F. for 8 hours and then determining the surface area of the sample by nitrogen adsorption using a Micromeritics® Digisorb 2500 Automatic Multi-Gas Surface Area and Pore Volume Analyzer. The hydrothermal treatment procedure used for the purpose of determining equilibrium surface area is the same as the procedure described in the main text of the previously cited publication entitled "Engelhard Procedure For The Hydrothermal Deactivation Of Fluid Catalytic Cracking Catalysts", except that the treatment is carried out for 8 hours rather than for 4 hours.

We believe that as the equilibrium surface area of the second component increases the ability of that component to reduce the quantity of oxides of sulfur in regenerator flue gases also increases. However, we also believe that as the equilibrium surface area of the second component increases the yields of dry gases, gases and coke will also increase. We believe that our use of a second component having an equilibrium surface area in the range of about 40–100 m²/g., preferably in the range of about 50–90 m²/g., results in a catalyst that in use will substantially reduce the quantity of oxides of sulfur in regenerator flue gases. In addition, we believe that the use of our second component will result in smaller yields of dry gases, gases, and coke than would occur if our second component were made from alumina having a greater equilibrium surface area than our second component.

The second component of our catalyst preferably comprises alumina which has been specially treated to make it more attrition resistant in a catalytic cracking unit. For example, the alumina may comprise a finely divided fraction of the product obtained by calcining α-alumina trihydrate (e.g., "C-30 alumina" marketed by the Aluminum Company of America) for at least about one hour at a temperature of about 750°–1200° F. and in an atmosphere comprising at least about ½ atmosphere of steam.

As another example, an alumina product having improved attrition resistance may be obtained by rehydrating certain calcined alumina products (e.g., "A-300 alumina" marketed by Kaiser Aluminum Chemical Corporation or "CP-100 alumina" marketed by the Aluminum Company of America). A finely divided fraction of the resulting rehydrated alumina may be introduced into the catalytic cracking unit in the rehydrated form or it may be calcined before it is introduced into that unit.

As used herein, rehydrated alumina shall include alumina that is obtained by treating calcined alumina with water or water vapor under conditions to crystallize at least part of the calcined alumina to aluminum hydrate. The product obtained by calcining rehydrated alumina under conditions to convert at least part of the aluminum hydrate in the rehydrated alumina to calcined alumina is referred to herein as calcined alumina made from rehydrated alumina.

The improved attrition resistant characteristics of the rehydrated alumina and the calcined alumina made from rehydrated alumina made by processes of the type described above can be measured by comparing the EAI (Engelhard Attrition Index) of the rehydrated alumina and the calcined alumina made from rehydrated alumina with the EAI of the calcined alumina from which the rehydrated alumina was made. The EAI of these products is determined by the procedure described in a publication entitled "Engelhard Attrition Index." A copy of this publication can be obtained from the Library identified above (Dewey Decimal Number 665.533 EC/EAI) or by writing to Engelhard's Minerals and Chemicals Division Patent Department.

As used herein, attrition resistant rehydrated alumina and attrition resistant calcined alumina made from rehydrated alumina shall include rehydrated alumina and calcined alumina made from rehydrated alumina that exhibit an EAI at least about 20% less than the EAI of the calcined alumina from which the rehydrated alumina was made.

We have found that some rehydrated alumina and calcined alumina made from rehydrated alumina are not more attrition resistant than the calcined alumina from which the rehydrated alumina was made. In particular, rehydrated alumina has been made at Engelhard Corporation by calcining C-30 alumina, under a first set of conditions, and then treating the calcined alumina, under a second set of conditions, to rehydrate it. Neither the rehydrated alumina made from calcined C-30 alumina nor calcined alumina made from that rehydrated alumina had a lower EAI than the calcined alumina that was obtained by calcining C-30 alumina.

In preferred embodiments of the present invention, at least a portion of the second component of our catalyst comprises a compound of a metal from the group consisting of cerium, lanthanum, neodymium, praseodymium, samarium, dysprosium, platinum, ruthenium, rhodium, palladium, osmium, iridium and mixtures thereof. The component of the metal may be distributed on all the particles of the second component of our catalyst or it may be distributed on only a fraction of the particles of the second component. Preferably, the compound of a metal is a compound of cerium or platinum. Most preferably a compound of cerium, e.g., cerium oxide or cerium trihydroxide is used. Most preferably, the second component contains about 1–4% by weight of cerium.

For the purpose of this application, all percentages of cerium in the second component were calculated as $CeO_2$. In addition, all percentages of alumina and cerium in the second component were calculated on a volatile free basis.

The catalyst of the present invention may be introduced into the cracking unit in a number of places. Preferably, the catalyst is introduced into the regeneration zone of the cracking unit where it is blended with equilibrium catalyst before it is introduced into the cracking zone of the cracking unit.

The catalyst of the present invention, like all commercial fluid catalytic cracking catalysts, will be hydrothermally deactivated during the operation of the cracking unit. Accordingly, as used herein, "cracking the petroleum feedstock in the presence of a catalyst" shall include cracking the petroleum feedstock in the presence of the catalyst in its fresh, partially deactivated or fully deactivated form.

DESCRIPTION OF THE PREFERRED EMBODIMENTS

The catalytically active first component of the catalyst of the present invention preferably comprises the microspheres containing at least about 40%, preferably about 50–70%, by weight Y-faujasite zeolite described in the previously identified '765 application. Those microspheres are characterized by exceptionally high activity and, in the most preferred embodiments, an attrition resistance better than or comparable to currently available commercial catalysts. In addition, the microspheres have good to excellent hydrothermal stability and will provide good yields of gasoline and low yields of coke and hydrogen.

As described in more detail in the '765 application, microspheres having all these desirable characteristics can be made by (a) crystallizing more than about 40% by weight Y-faujasite zeolite, under conditions described in the '765 application, in microspheres derived from a mixture of metakaolin clay and kaolin clay that has been calcined at least substantially through its characteristic exotherm, and (b) ion exchanging the resulting microspheres to replace the sodium cations in the microspheres with more desirable cations. The percentage of Y-faujasite in the microspheres is determined when the zeolite is in the sodium form (after it has been washed to remove any crystallization mother liquor contained within the microspheres) by the technique described in the ASTM standard method of testing titled "Relative Zeolite Diffraction Intensities" (Designation D3906-89) or by an equivalent technique.

The second component of our catalyst may comprise a finely divided fraction (e.g., the −140 mesh fraction of a number of commercially available sources of alumina. Particularly preferred commercially available sources of hydrated alumina are the α-alumina trihydrate products marketed by the Aluminum Company of America as "C-30 alumina" and by Reynolds Metal Co. as "RH-30 alumina." Particularly preferred sources of commercially available calcined alumina are "A-300 alumina" marketed by the Kaiser Aluminum & Chemical Corporation and "CP-100 alumina" marketed by the Aluminum Company of America.

In preferred embodiments of the present invention, the second component of our catalyst comprises a finely divided fraction of a modified form of a commercially available source of alumina. For example, a preferred second component of our invention comprises a finely divided fraction of alumina that was made by calcining C-30 alumina for at least about 1 hour at about 750°–1200° F. and in an atmosphere comprising at least about ½ atmosphere of steam. A preferred procedure for calcining C-30 alumina in steam is described in Example 1 below. We prefer to use a finely divided fraction of this modified form of C-30 alumina, rather than a finely divided fraction of C-30 alumina itself, because we believe that the modified form of the alumina will be more attrition resistant in catalytic cracking units. In particular, when a finely divided fraction of C-30 alumina is introduced into catalytic cracking units we believe it will be calcined to a significantly softer form. We believe that a finely divided fraction of alumina obtained by calcining C-30 alumina in steam as described above will exhibit superior attrition resistant characteristics in a catalytic cracking unit as compared to a finely divided fraction of unmodified C-30 alumina.

In another preferred embodiment of the present invention, the second component of our invention comprises attrition resistant rehydrated alumina. Preferred processes for making such attrition resistant rehydrated alumina are described in Examples 2 and 3 below. The attrition resistant rehydrated alumina may be blended with our catalytically active first component or it may be calcined to attrition resistant calcined alumina made from rehydrated alumina and then blended with the catalytically active first component of our invention.

In preferred embodiments of the present invention, the second component of our catalyst also includes a metal compound from the group of metals consisting of cerium, lanthanum, neodymium, praseodymium, samarium, dysprosium, platinum, ruthenium, rhodium, palladium, osmium, iridium and mixtures thereof. Preferably, the metal compound is a compound of cerium (e.g., cerium trihydroxide or cerium oxide) which is present in an amount sufficient to provide about 1–4% by weight cerium in the second component.

We believe that the compounds of the metals listed in the preceding paragraph enhance the ability of our catalyst to reduce the quantity of the oxides of sulfur in regenerator flue gases, especially when those flue gases contain a relatively large amount of oxygen (i.e., greater than about 500 ppmv $O_2$). In particular, we believe that those metals catalyze a reaction between $SO_2$ and $O_2$ to yield $SO_3$, which is more readily removed from the flue gas by the second component of our catalyst than is $SO_2$.

The metal compound may be deposited on the fluidizable particles of alumina by impregnating those particles with an aqueous solution of a salt of the metal, e.g., an aqueous solution comprising cerium acetate or cerium nitrate hexahydrate. The resulting impregnated fluidizable particles may then be treated to convert the metal salt to a metal hydroxide or a metal oxide. Alternatively, the impregnated fluidizable particles containing the metal salt may be blended with the first component of our catalyst and introduced into the cracking unit in that form. The metal salt is then calcined to a metal oxide in the fluid catalytic cracking unit.

The catalyst of the present invention may include components in addition to the previously described two components. For example, the catalyst may contain a minor amount (e.g., 10–20% by weight) of an additional catalytically active component containing Y-faujasite.

The examples which follow illustrate the catalyst of the present invention.

EXAMPLE 1

A fluidized bed of C-30 alumina particles was calcined in 100% steam by the following procedure:

About 5 kg. of C-30 alumina particles were placed on a fritted plate in a vertical tube reactor. For one hour, 100% steam at about 15 psia was passed through the alumina particles at a rate sufficient to fluidize the particles. The fluidized bed was maintained at about 1050° F. while the steam was being passed through it.

A −140 mesh fraction of the steamed alumina particles had an equilibrium surface area of 56 m$^2$/g. and exhibited a loss on ignition (LOI) of 1.1% by weight.

LOI may be determined by measuring the weight loss of a sample after it was calcined for ½ hour at about 800° F. and then for one hour at about 1830° F.

About 1300 g. of a −140 mesh fraction of the steamed alumina particles were impregnated with 520 ml. of a 1.1 molar solution of cerium nitrate hexahydrate. The impregnated particles were dried in an oven at 200° F. and then calcined at 1200° F. for one hour in a muffle furnace. The resulting fluidizable particles contained 92% by weight $Al_2O_3$ and 6.4% by weight $CeO_2$. The fluidizable particles had an equilibrium surface area of 60 $m^2/g$ and exhibited an LOI of 2.5% by weight.

Microspheres comprising about 58% Y-faujasite were prepared by a process of a type described in the previously identified '765 application. More particularly, the microspheres containing Y-faujasite zeolite were prepared by a process of the type described in the '765 application in which: (a) the non-zeolitic component of the microspheres was derived from a mixture of metakaolin and clay that was calcined through its characteristic exotherm without any substantial formation of mullite in which the two types of clay were present in the same microspheres; (b) the clay that was calcined through the characteristic exotherm was made from ASP® 900 hydrous clay (a commercially available hydrous kaolin clay described in Engelhard Technical Bulletin No. TI-1004, entitled "Aluminum Silicate Pigments" (EC-1167)); (c) the metakaolin was made from ASP® 600 hydrous clay (a commercially available hydrous kaolin clay described in the previously identified Engelhard Technical Bulletin entitled "Aluminum Silicate Pigments"); (d) the zeolite crystallization process was internally seeded with a mixture containing amorphous zeolite initiator; (e) after the zeolite crystallization process and before ion exchange, the zeolite containing microspheres were washed with water; and (f) after washing with water, the zeolite containing microspheres were ion exchanged to contain about 8.65% by weight of rare earth oxides and about 0.28% by weight of sodium oxide.

A catalyst blend was prepared comprising: (a) 25% by weight of the microspheres containing about 58% by weight Y-faujasite described in this example; (b) 55% by weight of a −140 mesh fraction of the steamed alumina particles having an equilibrium surface area of 56 $cm^2/g$. described in this example; and (c) 20% by weight of the alumina particles containing 6.4% by weight $CeO_2$ described in this example.

Two samples of the resulting blend were then hydrothermally deactivated at 1500° F. for 4 hours in accordance with the procedure described in the main text of the previously cited publication entitled "Engelhard Procedure For The Hydrothermal Deactivation Of Fluid Catalytic Cracking Catalysts." Two additional samples of the blend were hydrothermally deactivated by the same procedure, except that the hydrothermal deactivation was carried out for 8 hours rather than 4 hours.

The two samples that were hydrothermally deactivated for four hours were tested by the Engelhard Microactivity Test. In that test, 1.2 g. of a gas oil feedstock was cracked by passing it at a uniform rate, over a period of forty eight seconds, through 6 g. of a fixed non-fluidized bed of the hydrothermally deactivated catalyst sample that was maintained at an average temperature of about 900° F. The yields of the products obtained during each test were determined. The conversion that was obtained during each test was calculated based on those yields.

The two samples that were hydrothermally deactivated for eight hours were tested to determine their reversible sulfur pick-up. This was done by contacting 15 g. of each sample in a fixed fluidized bed with 500 cc/min. of an $SO_2$ containing gas (containing about 1% by volume $SO_2$, about 3% by volume $O_2$ and about 96% by volume $N_2$) for 45 minutes and at a temperature of about 1350° F. The sulfur content of each resulting sulfated sample was then measured. Then each sample was desulfated by passing 1.2 g. of a gas oil feedstock at a uniform rate, over a period of forty eight seconds, through 6 g. of a fixed non-fluidized bed of the sample that was maintained at an average temperature of about 950° F. The sulfur content of each desulfated sample was then measured. The reversible sulfur pick-up was calculated as the difference between the sulfur content of the sulfated sample and the sulfur content of the desulfated sample.

The results of the above tests, as well as the results of tests for the "standard" catalysts described below and for the catalysts of Examples 2–6, are recorded in Table I below. Each number recorded in Table I for a characteristic of the catalyst of this example is an average value based on the two separate runs for that characteristic.

TABLE I

| Sample | Reversible Sulfur Pick-Up (wt. %) | Conversion (wt. %) | Dry Gas Yield (wt. %) | Gas Yield (wt. %) | Gasoline Yield (wt. %) | Coke Yield (wt. %) |
|---|---|---|---|---|---|---|
| Standard A | 0.132 | 70.5 | 1.39 | 13.3 | 52.7 | 4.55 |
| Standard B | 0.340 | 73.4 | 1.40 | 14.2 | 54.1 | 5.02 |
| Example 1 | 0.186 | 66.0 | 1.05 | 11.6 | 50.6 | 3.68 |
| Example 2 | 0.319 | 71.0 | 1.10 | 11.8 | 54.7 | 4.57 |
| Example 3 | 0.297 | 68.1 | 1.02 | 11.1 | 52.7 | 4.24 |
| Example 4 | 0.234 | 67.4 | 1.06 | 12.0 | 51.6 | 3.79 |
| Example 5 | 0.191 | | | | | |
| Example 6 | 0.268 | 66.6 | 0.96 | 11.0 | 51.8 | 3.79 |

Standard A referred to in Table I comprised a blend of 80% by weight of HEZ®-55 catalyst and 20% by weight of sulfur reduction catalyst X. Sulfur reduction catalyst X had an equilibrium surface area of 115 $m^2/g$., comprised 93% by weight alumina and 6% by weight of $CeO_2$, and exhibited an LOI of 5.3% by weight. Standard B referred to in Table I comprised a blend of 25% by weight of the microspheres containing about 58% by weight Y-faujasite described above, 20% by weight of sulfur reduction catalyst X described above, an 55% by weight of sulfur reduction catalyst Y. Sulfur reduction catalyst Y comprised 99% by weight alumina, had an equilibrium surface area of 121 $m^2/g$., and exhibited an LOI of 2.4% by weight. Each number recorded for a characteristic of the Standard A and the Standard B catalysts in Table I is an average value based on two separate runs for that characteristic.

EXAMPLE 2

About 1333 g. of A-300 alumina were mixed with about 1667 ml. of water to obtain a slurry having a pH of about 9.3. The slurry was heated to 150° F. for 6½ hours to rehydrate the alumina particles. The slurry was filtered and the alumina particles were washed and dried in an oven at 200° F. to obtain a rehydrated alumina product that exhibited an LOI of 16.8% by weight.

The rehydrated alumina was calcined at 1200° F. for one hour. A −140 mesh fraction of the resulting calcined alumina had an equilibrium surface area of 81 m$^2$/g.

About 250 g. of a −140 fraction of the calcined alumina made from rehydrated alumina were impregnated with 125 ml. of a 0.85 molar solution of cerium nitrate hexahydrate. The particles of alumina containing cerium nitrate hexahydrate were mixed with 551 g. of a solution containing 4.8% by weight sodium hydroxide. The resulting slurry was maintained at room temperature for ½ hour during which time the cerium nitrate hexahydrate in the particles reacted with the sodium hydroxide to form, inter alia, cerium trihydroxide. The slurry was filtered to obtain particles of alumina containing cerium trihydroxide. After the particles were washed and dried, they were calcined at 1200° F. for 1 hour in a muffle oven to convert the cerium trihydroxide to cerium oxide. The resulting fluidizable particles contained 89% by weight $Al_2O_3$ and 6.4% by weight $CeO_2$, had an equilibrium surface area of 95 m$^2$/g., and exhibited an LOI of 7.8% by weight.

A catalyst blend was prepared comprising: (a) 25% by weight of the microspheres containing about 58% by weight Y-faujasite described in Example 1; (b) 55% by weight of a −140 mesh fraction of the calcined alumina made from rehydrated alumina and having an equilibrium surface area of 81 m$^2$/g. described in this example; and (c) 20% by weight of the alumina particles containing 6.4% by weight $CeO_2$ described in this example.

Two separate samples of the resulting blend were tested to determine the blend's catalytic activity by the procedure described in Example 1. In addition, a sample of the blend was hydrothermally deactivated at 1500° F. for 8 hours and then tested, in duplicate, to determine the blend's reversible sulfur pick-up by the procedure described in Example 1. The averages of the results of those tests are recorded in Table I.

EXAMPLE 3

About 1600 g. of CP-100 alumina were mixed with about 2000 g. of water to obtain a slurry having a pH of about 9.5. The resulting slurry was heated to 150° F. for 6 hours to rehydrate the alumina particles. The slurry was filtered and the alumina particles were washed and dried in an oven at 200° F. to obtain a rehydrated alumina product that exhibited an LOI of 20.9% by weight.

The rehydrated alumina was calcined for 1 hour at 1200° F. A −140 mesh fraction of the resulting calcined alumina had an equilibrium surface area of 90 m$^2$/g.

About 150 g. of a −140 mesh fraction of the calcined alumina made from rehydrated alumina were impregnated with about 75 ml. of a 0.83 molar solution of cerium nitrate hexahydrate. The particles of alumina containing cerium nitrate hexahydrate were mixed with 272 g. of a solution containing 5.88% by weight sodium hydroxide. The resulting slurry was maintained at room temperature for ½ hour during which time the cerium nitrate hexahydrate in the particles reacted with the sodium hydroxide to form, inter alia, cerium trihydroxide. The slurry was filtered to obtain particles of alumina containing cerium trihydroxide. After the particles were washed and dried in an oven at 200° F., they were calcined at 1200° F. for 1 hour in a muffle furnace to convert the cerium trihydroxide to cerium oxide. The resulting fluidizable particles contained 92% by weight $Al_2O_3$ and 6.0% by weight $CeO_2$, had an equilibrium surface area of 73 m$^2$/g., and exhibited an LOI of 4.9% by weight.

A catalyst blend was prepared comprising: (a) 25% by weight of the microspheres containing about 58% by weight Y-faujasite described in Example 1; (b) 55% by weight of a −140 mesh fraction of the calcined alumina made from rehydrated alumina and having an equilibrium surface area of 90 m$^2$/g. described in this example; and (c) 20% by weight of the alumina particles containing 6.0% by weight $CeO_2$ described in this example.

Two separate samples of the resulting blend were tested to determine the blend's catalytic activity by the procedure described in Example 1. In addition, two separate samples of the blend were tested to determine the blend's reversible sulfur pick-up by the procedure described in Example 1. The averages of the results of those tests are recorded in Table I.

EXAMPLE 4

About 300 g. of a −140 mesh fraction of A-300 particles were impregnated with 150 ml. of a 0.88 molar solution of cerium nitrate hexahydrate. The impregnated particles were dried in an oven at 200° F. and then calcined at 1200° F. for one hour in a muffle furnace. The resulting fluidizable particles contained 93% by weight $Al_2O_3$ and 5.6% by weight $CeO_2$. The fluidizable particles had an equilibrium surface area of 64 m$^2$/g. and exhibited an LOI of 7.6% by weight.

A catalyst blend was prepared comprising: (a) 25% by weight of the microspheres containing about 58% by weight Y-faujasite described in Example 1; (b) 55% by weight of a −140 mesh fraction of A-300 alumina particles having an equilibrium surface area of 65 m$^2$/g. and exhibiting an LOI of 6.0% by weight; and (c) 20% by weight of the alumina particles containing 5.6% by weight $CeO_2$ described in this example.

Two separate samples of the resulting blend were tested to determine the blend's catalytic activity by the procedure described in Example 1. In addition, two separate samples of the blend were tested to determine the blend's reversible sulfur pick-up by the procedure described in Example 1. The averages of the results of those tests are recorded in Table I.

EXAMPLE 5

A batch of alumina particles that were calcined in steam was made from C-30 alumina by the procedure described in Example 1.

About 400 g. of a −140 mesh fraction of the calcined alumina particles were impregnated with 200 ml. of a 0.27 molar solution comprising cerium nitrate hexahydrate. The impregnated particles were dried in an oven at 200° F. and calcined at 1200° F. for one hour in a muffle furnace. The resulting fluidizable particles contained 97% by weight $Al_2O_3$ and 2.1% by weight $CeO_2$. The fluidizable particles had an equilibrium surface area of 68 m$^2$/g. and exhibited an LOI of 2.6% by weight.

A catalyst blend was prepared comprising: (a) 25% by weight of the microspheres containing about 58% by weight Y-faujasite described in Example 1; and (b) 75% by weight of the alumina particles containing 2.1% by weight $CeO_2$ described in this example.

Two separate samples of the blend were tested to determine the blend's reversible sulfur pick-up by the procedure described in Example 1. The average of the results of those tests is recorded in Table I.

EXAMPLE 6

A batch of alumina particles that were calcined in steam was made from C-30 alumina by the procedure described in Example 1, except that the fluidized bed was maintained at about 90° F. rather than at about 1050° F. A −140 mesh fraction of the steamed, calcined particles had an equilibrium surface area of 56 $m^2/g$. and exhibited an LOI of 3.8% by weight.

About 1300 g. of a −140 mesh fraction of the steamed, calcined alumina particles were impregnated with 650 ml. of a 0.88 molar solution of cerium nitrate hexahydrate. The impregnated particles were dried in an oven at 200° F. and calcined at 1200° F. for 1 hour in a muffle furnace. The resulting fluidizable particles contained 93% by weight $Al_2O_3$ and 5.9% by weight $CeO_2$. The fluidizable particles had an equilibrium surface area of 63 $m^2/g$. and exhibited an LOI of 3.9% by weight.

A catalyst blend was prepared comprising: (a) 25% by weight of the microspheres containing about 58% by weight Y-faujasite described in Example 1; (b) 55% by weight of a −140 mesh fraction of the steamed, calcined alumina particles made from C-30 alumina and having an equilibrium surface area of 56 $m^2/g$. described in this example; and (c) 20% by weight of the alumina particles containing 5.9% by weight $CeO_2$ described in this example.

Two separate samples of the resulting blend were tested to determine the blend's catalytic activity by the procedure described in Example 1. In addition, two separate samples of the blend were tested to determine the blend's reversible sulfur pick-up by the procedure described in Example 1. The averages of the results of those tests are recorded in Table I.

What is claimed is:

1. A fluid catalytic cracking catalyst comprising a blend of a catalytically active first component and a second component for reducing the emissions of oxides of sulfur from the regenerator of a fluid catalytic cracking unit, said catalyst comprising:
   (a) about 10–70% by weight of fluidizable particles comprising at least about 40% by weight Y-faujasite; and
   (b) about 30–90% by weight of fluidizable particles comprising at least about 70% by weight alumina and having an equilibrium surface area in the range of about 40–100 $m^2/g$.

2. The fluid catalytic cracking catalyst of claim 1 wherein component (b) comprises at least about 90% by weight alumina.

3. The fluid catalytic cracking catalyst of claim 2 wherein the equilibrium surface area of component (b) is in the range of about 50–90 $m^2/g$.

4. The fluid catalytic cracking catalyst of claim 2 wherein the catalyst comprises about 25–50% by weight of component (a) and about 50–75% by weight of component (b).

5. The fluid catalytic cracking catalyst of claim 2 wherein component (a) has a deactivated activity at least about 1.5 times that of standard commercial catalyst.

6. The fluid catalytic cracking catalyst of claim 5 wherein component (a) has a deactivated activity at least about 2.0 times that of standard commercial catalyst.

7. The fluid catalytic cracking catalyst of claim 6 wherein component (a) comprises microspheres comprising about 50–70% by weight Y-faujasite.

8. The fluid catalytic cracking catalyst of claim 2 wherein component (b) comprises attrition resistant rehydrated alumina.

9. The fluid catalytic cracking catalyst of claim 2 wherein component (b) comprises attrition resistant calcined alumina made from rehydrated alumina.

10. The fluid catalytic cracking catalyst of claim 3 wherein component (b) comprises attrition resistant rehydrated alumina.

11. The fluid catalytic cracking catalyst of claim 3 wherein component (b) comprises attrition resistant calcined alumina made from rehydrated alumina.

12. The fluid catalytic cracking catalyst of claim 2 wherein component (b) comprises a compound of a metal selected from the group consisting of cerium, lanthanum, neodymium, praseodymium, samarium, dysprosium, platinum, ruthenium, rhodium, palladium, osmium, iridium and mixtures thereof.

13. The fluid catalytic cracking catalyst of claim 12 wherein the compound of a metal comprises a compound of cerium.

14. The fluid catalytic cracking catalyst of claim 13 wherein component (b) comprises about 1–4% by weight of cerium.

15. A fluid catalytic cracking catalyst comprising a blend of a catalytically active first component and a second component for reducing the emissions of oxides of sulfur from the regenerator of a fluid catalytic cracking unit, said catalyst comprising:
   (a) about 10–70% by weight of fluidizable particles comprising Y-faujasite and having a deactivated activity at least about 1.5 times that of standard commercial catalyst; and
   (b) about 30–90% by weight of fluidizable particles comprising at least about 70% by weight alumina and having an equilibrium surface area in the range of about 40–100 $m^2/g$.

16. The fluid catalytic cracking catalyst of claim 15 wherein component (b) comprises at least about 90% by weight alumina.

17. The fluid catalytic cracking catalyst of claim 16 wherein the equilibrium surface area of component (b) is in the range of about 50–90 $m^2/g$.

18. The fluid catalytic cracking catalyst of claim 16 wherein the catalyst comprises about 25–50% by weight of component (a) and about 50–75% by weight of component (b).

19. The fluid catalytic cracking catalyst of claim 16 wherein component (a) has a deactivated activity at least about 2.0 times that of standard commercial catalyst.

20. The fluid catalytic cracking catalyst of claim 16 wherein component (a) comprises microspheres comprising about 50–70% by weight Y-faujasite.

21. The fluid catalytic cracking catalyst of claim 16 wherein component (b) comprises attrition resistant rehydrated alumina.

22. The fluid catalytic cracking catalyst of claim 16 wherein component (b) comprises attrition resistant calcined alumina made from rehydrated alumina.

23. The fluid catalytic cracking catalyst of claim 17 wherein component (b) comprises attrition resistant rehydrated alumina.

24. The fluid catalytic cracking catalyst of claim 17 wherein component (b) comprises attrition resistant calcined alumina made from rehydrated alumina.

25. The fluid catalytic cracking catalyst of claim 16 wherein component (b) comprises a compound of a metal selected from the group consisting of cerium, lanthanum neodymium, praseodymium, samarium, dysprosium, platinum, ruthenium, rhodium, palladium, osmium, iridium and mixtures thereof.

26. The fluid catalytic cracking catalyst of claim 25 wherein the compound of a metal comprises a compound of cerium.

27. The fluid catalytic cracking catalyst of claim 26 wherein component (b) comprises about 1–4% by weight of cerium.

28. A process for cracking a sulfur containing petroleum feedstock comprising cracking the feedstock in the presence of the fluid catalytic cracking catalyst of claim 1.

29. A process for cracking a sulfur containing petroleum feedstock comprising cracking the feedstock in the presence of the fluid catalytic cracking catalyst of claim 3.

30. A process for cracking a sulfur containing petroleum feedstock comprising cracking the feedstock in the presence of the fluid catalytic cracking catalyst of claim 18.

31. A process for cracking a sulfur containing petroleum feedstock comprising cracking the feedstock in the presence of the catalytic cracking catalyst of claim 17.

32. The fluid catalytic cracking catalyst of claim 1 wherein the fluidizable particles comprising at least about 40% by weight Y-faujasite have less than about 0.20 cc/g. of pores having diameters in the range of 20–100Å and have the following characteristics:
  (a) a deactivated activity at least about 1.5 times that of standard commercial catalyst;
  (b) a severely deactivated activity at least about 1.5 times that of standard commercial catalyst;
  (c) a coke yield no greater than about that of standard commercial catalyst at 70% conversion; and
  (d) an EAI no more than about 5.0 times that of standard commercial catalyst.

33. The fluid catalytic cracking catalyst of claim 32 wherein the fluidizable particles comprising at least about 40% by weight Y-faujasite have the following characteristics:
  (a) a deactivated activity at least about 2.0 times that of standard commercial catalyst;
  (b) a severely deactivated activity at least about 2.0 times that of standard commercial catalyst; and
  (c) an EAI no more than about 3.0 times that of standard commercial catalyst.

34. The fluid catalytic cracking catalyst of claim 32 wherein the fluidizable particles comprising at least about 40% by weight Y-faujasite contain a non-zeolitic component comprising the zeolite crystallization process residue of calcined clay, said calcined clay comprising about 30–60% by weight metakaolin and about 40–70% by weight kaolin clay that had been calcined at least substantially through its characteristic exotherm.

35. The fluid catalytic cracking catalyst of claim 1 wherein the fluidizable particles comprising at least about 40% by weight Y-faujasite contain less than about 0.7% by weight $Na_2O$, more than about 4% by weight REO, and have a $SiO_2/Al_2O_3$ molar ratio of about 1.7–3.4, less than about 0.20 cc/g. of pores having diameters in the range of 20–100Å less than about 0.30 cc/g. of pores having diameters in the range of 600–20,000Å, a surface area of about 300–750m²/g. and a bulk density of the 200/270 mesh fraction of about 0.8–1.2 g./cc., the Y-faujasite containing particles comprising:
  (a) a non-zeolitic component comprising the zeolite crystallization process residue of calcined clay, said calcined clay comprising about 30–60% by weight metakaolin and about 40–70% by weight kaolin clay that had been calcined at least substantially through its characteristic exotherm; and
  (b) Y-faujasite having, in the sodium form, a crystalline unit cell size of less than about 24.73Å.

36. The fluid catalytic cracking catalyst of claim 15 wherein the fluidizable particles comprising Y-faujasite contain at least about 40% by weight Y-faujasite, have less than about 0.20 cc/g of pores having diameters in the range of 20–100Å, and have the following characteristics:
  (a) a severely deactivated activity at least about 1.5 times that of standard commercial catalyst;
  (b) a coke yield no greater than about that of standard commercial catalyst at 70% conversion; and
  (c) an EAI no more than about 5.0 times that of standard commercial catalyst.

37. The fluid catalytic cracking catalyst of claim 36 wherein the fluidizable particles comprising Y-faujasite have the following characteristics:
  (a) a deactivated activity at least about 2.0 times that of standard commercial catalyst;
  (b) a severely deactivated activity at least about 2.0 times that of standard commercial catalyst; and
  (c) an EAI no more than about 3.0 times that of standard commercial catalyst.

38. The fluid catalytic cracking catalyst of claim 36 wherein the fluidizable particles comprising Y-faujasite contain a non-zeolitic component comprising the zeolite crystallization process residue of calcined clay, said calcined clay comprising about 30–60% by weight metakaolin and about 40–70% by weight kaolin clay that had been calcined at least substantially through its characteristic exotherm.

39. The fluid catalytic cracking catalyst of claim 19 wherein the fluidizable particles comprising Y-faujasite contain more than about 40% by weight Y-faujasite, less than about 0.7% by weight $Na_2O$, more than about 4% by weight REO, and have a $SiO_2/Al_2O_3$ molar ratio of about 1.7–3.4, less than about 0.20 cc/g. of pores having diameters in the range of 20–100Å, less than about 0.30 cc/g. of pores having diameters in the range of 600–20,000Å, a surface area of about 300–750m²/g. and a bulk density of the 200/270 mesh fraction of about 0.8–1.2 g./cc., the Y-faujasite containing particles comprising:
  (a) a non-zeolitic component comprising the zeolite crystallization process residue of calcined clay, said calcined clay comprising about 30–60% by weight metakaolin and about 40–70% by weight kaolin clay that had been calcined at least substantially through its characteristic exotherm; and
  (b) Y-faujasite having, in the sodium form, a crystalline unit cell size of less than about 24.73Å.

* * * * *

UNITED STATES PATENT AND TRADEMARK OFFICE
CERTIFICATE OF CORRECTION

PATENT NO. : 4,606,813
DATED : August 19, 1986
INVENTOR(S) : John W. Byrne et al It is certified that error appears in the above—identified patent and that said Letters Patent is hereby corrected as shown below:

Column 3, Line 7 delete the word [togehter] and insert --together--

Column 9, Line 59 delete the pharse [cm$^2$/g] and insert --m$^2$/g--

Signed and Sealed this

Seventeenth Day of March, 1987

Attest:

DONALD J. QUIGG

Attesting Officer

Commissioner of Patents and Trademarks